United States Patent [19]
Takei et al.

[11] Patent Number: 5,836,753
[45] Date of Patent: Nov. 17, 1998

[54] SEAL ARRANGEMENT FOR ENGINE-DRIVEN SUPERCHARGER

[75] Inventors: Nobuo Takei, Urayasu; Shigeru Takabe, Sagamihara, both of Japan

[73] Assignee: Ishikawajima-Harima Heavy Industries Co., Ltd., Tokyo, Japan

[21] Appl. No.: 891,216

[22] Filed: Jul. 10, 1997

Related U.S. Application Data

[62] Division of Ser. No. 711,258, Sep. 9, 1996, abandoned.

[30] Foreign Application Priority Data

Nov. 22, 1995 [JP] Japan .................................. 7-304481

[51] Int. Cl.$^6$ .................................................. F04C 27/00
[52] U.S. Cl. ............................................ 418/95; 418/104
[58] Field of Search ...................... 418/95, 104; 415/111, 415/112, 168.2, 168.4

[56] References Cited

U.S. PATENT DOCUMENTS

| | | | |
|---|---|---|---|
| 4,153,395 | 5/1979 | O'Neill ..................... | 418/104 |
| 4,594,992 | 6/1986 | Nakamura et al. ....... | 418/104 |
| 4,709,682 | 12/1987 | Kato .......................... | 418/104 |
| 4,755,115 | 7/1988 | Akaike ..................... | 418/104 |
| 5,348,456 | 9/1994 | Kun et al. ................. | 418/104 |
| 5,385,351 | 1/1995 | White ....................... | 418/104 |
| 5,490,771 | 2/1996 | Wehber et al. .......... | 418/104 |

FOREIGN PATENT DOCUMENTS

| | | | |
|---|---|---|---|
| 3619754 | 2/1987 | Germany ................ | 418/104 |
| 1-170783 | 7/1989 | Japan ..................... | 418/104 |

*Primary Examiner*—John J. Vrablik
*Attorney, Agent, or Firm*—McCormick, Paulding & Huber

[57] ABSTRACT

A seal arrangement for an engine-driven supercharger to prevent burning and abnormal wear of an rubber-made oil seal fitted on a shaft of a rotor of the supercharger. The supercharger includes a housing, a rotor chamber is formed in the housing and the rotor is rotatably placed in the rotor chamber. A shaft chamber is formed next to the rotor chamber. The rotor shaft projects from the rotor chamber into the shaft chamber in a longitudinal direction of the rotor. A bearing is provided inside the shaft chamber for supporting the rotor shaft at a free end of the rotor shaft. A lubrication oil is fed to the bearing. The supercharger sucks external air into the rotor chamber by making the rotor chamber pressure negative and rotates the rotor for compressing the air in the rotor chamber. The oil seal is fitted on the rotor shaft between the bearing and the rotor chamber for defining an oil chamber in the shaft chamber between the oil seal and the bearing. An air chamber is defined in the shaft chamber between the oil seal and the rotor chamber. An air passage extends from the air chamber to the outside so that positive or negative pressure of the air leaking to the air chamber from the rotor chamber is lowered or raised when the air enters the air chamber which communicates with the outside via the first air passage.

24 Claims, 4 Drawing Sheets

12,836,753

SEAL ARRANGEMENT FOR ENGINE-DRIVEN SUPERCHARGER

This is a divisional of application Ser. No. 08/711,258 filed on Sep. 9, 1996, abandoned.

BACKGROUND OF THE INVENTION

1. Technical Field

The present invention relates to a seal arrangement for a shaft of a rotor of a gear-driven or engine-driven supercharger and more particularly to such a seal arrangement which has a simple construction but is able to greatly moderate fluctuation of pressures leaking from a rotor chamber of the supercharger and applied onto an oil seal fitted on the rotor shaft from a rotor chamber of the supercharger.

2. Background Art

Generally, a gear-driven or engine-driven supercharger includes a housing, a rotor chamber defined in the housing, a male rotor rotatably placed in the rotor chamber, and a female rotor also rotatably placed in the rotor chamber and engaged with the male rotor. The male and female rotors extend in parallel to each other in the rotor chamber, and they are rotated in opposite directions upon rotation of an engine or the like. Drive power of the engine is generally transmitted to the male and female rotors by a chain mechanism and/or a gear train. Each rotor has drive shafts extending in opposite directions from ends of the rotor in a longitudinal direction of the rotor. Drive shaft chambers are also formed in the supercharger housing next to the rotor chamber in the longitudinal direction of the rotor chamber, and the drive shafts of each rotor project into the associated drive shaft chambers from the rotor chamber and are supported by bearings provided in the drive shaft chambers at free ends thereof. External air flowing in an intake manifold of the engine is sucked into the supercharger housing from a first opening (entrance opening) and gradually compressed in the supercharger housing in the longitudinal direction of the supercharger housing upon rotation of the male and female rotors. The compressed air is discharged to cylinders of the engine from a second opening (exit opening) of the housing of the supercharger. The drive shafts of the male rotor (or those of the female rotor) are generally connected to a crankshaft or another rotative shaft of the engine by belts, chains and/or gears so that the rotor is driven by the engine. Lubrication oil is fed to the bearings of the drive shafts of the male and female rotors. Oil seals are fitted over the respective drive shafts in the drive shaft chambers between the rotor chamber and the associated bearings to dam the lubrication oil and form an oil chamber. Air of positive and negative pressure produced by pressure fluctuation inside the rotor chamber tends to leak toward the bearings from the rotor chamber along the rotor drive shafts. Each oil seal provided on the rotor shaft should prevent that the high and low pressure air leaking from the rotor chamber acts on the oil seal and damages it. Conventionally, if the supercharger is a Roots type supercharger (its operational pressure is relatively low and circumferential speed is about 10–15 m/sec), the oil seals are made from rubber sheets. If the supercharger rotates at a high speed and operates under high pressure, mechanical seals made from carbon or the like are usually employed.

When the rubber-sheet-made oil seal is used in an engine-driven supercharger which operates under a high speed and high pressure condition, lip portions of the oil seal which contact the associated rotor shaft are strongly pressed against and peeled from the rotor shaft surface upon leakage of the positive and negative pressure from the rotor chamber. This causes burning and/or abnormal wear and tear of the lip portions of the oil seal and results in lubrication oil leakage from the bearings. Therefore, it is impossible to use a rubber seal as an oil seal for the rotor shaft of a high pressure and high speed supercharger.

When the mechanical seal which is stiffer than the rubber seal is used, the pressure fluctuation leaking from the rotor chamber does not cause the sticking and abnormal abrasion. However, a manufacturing cost for the mechanical seal is considerably high since it is made from an expensive material such as carbon.

SUMMARY OF THE INVENTION

One object of the present invention is to provide an oil seal arrangement for an engine-driven supercharger, which is inexpensive but does not cause oil leakage from a lip portion of an oil seal even if the supercharger operates at high speed and high pressure.

Another object of the present invention is to provide an oil seal arrangement for a supercharger, which includes a rubber seal but never causes burning or abnormal wear of the seal under any running conditions of the supercharger.

According to one aspect of the present invention, there is provided a sealing arrangement for a supercharger of a type including a housing, a rotor chamber formed in the housing, a rotor shaft chamber formed next to the rotor chamber in the housing, a rotor rotatably placed in the rotor chamber and having a shaft extending into the shaft chamber from the rotor chamber, and a bearing provided in the rotor shaft chamber for supporting a free end of the rotor shaft, comprising: an oil seal fitted over the rotor shaft between the rotor chamber and the bearing for dividing the shaft chamber into two chambers, one being a lubrication oil chamber defined between the oil seal and the bearing to collect or dam a lubrication oil supplied to the bearing in the oil chamber and the other being an air chamber defined between the oil seal and the rotor chamber; and an air passage formed in the supercharger housing for connecting the air chamber to the outside. The oil seal may be a rubber seal. Air of positive and negative pressure leaks to the air chamber from the rotor chamber as the rotor compresses the air in the rotor chamber and the external air is sucked into the rotor chamber. Pressure of the air leaking into the air chamber is moderated when the air enters the air chamber since the air chamber is communicated with the outside. Specifically, the positive pressure is substantially lowered to the atmosphere pressure and the negative pressure is substantially raised to the atmosphere pressure in the air chamber. Accordingly, the air pressure which acts on the oil seal is not harmful to the oil seal and the oil seal is not damaged. A rubber oil seal is inexpensive so that the manufacturing cost for the seal arrangement is reduced.

A throttled passage may be formed between the rotor chamber and the shaft chamber so that the positive or negative air pressure is lowered or raised as the leakage air proceeds to the air chamber from the rotor chamber through the throttled passage.

An air filter may be provided in the air passage for introducing filtered air into the air chamber.

If the very high (or low) pressure leaks from the rotor chamber, the air pressure may not be lowered (or raised) to an acceptable value by the single air chamber. In such a case, another air chamber (i.e., second air chamber) may be formed in tandem to the already formed air chamber to moderate the air pressure in a stepwise manner. For this end, an air seal may be provided in the air chamber to divide the air chamber into two sub-chambers and one air passage may extend from each sub-chamber to the outside. The very high pressure from the rotor chamber may be first lowered to a certain value in the first sub-chamber and the pressure may be further lowered in the second sub-chamber. Therefore, the oil seal located downstream of the second sub-chamber may not be affected by the high pressure leaking from the rotor chamber.

BRIEF DESCRIPTION OF THE ACCOMPANYING DRAWINGS

DETAILED DESCRIPTION OF THE PREFERRED EMBODIMENTS

Now, preferred embodiments of the present invention will be described with reference to the accompanying drawings.

Figure 1:
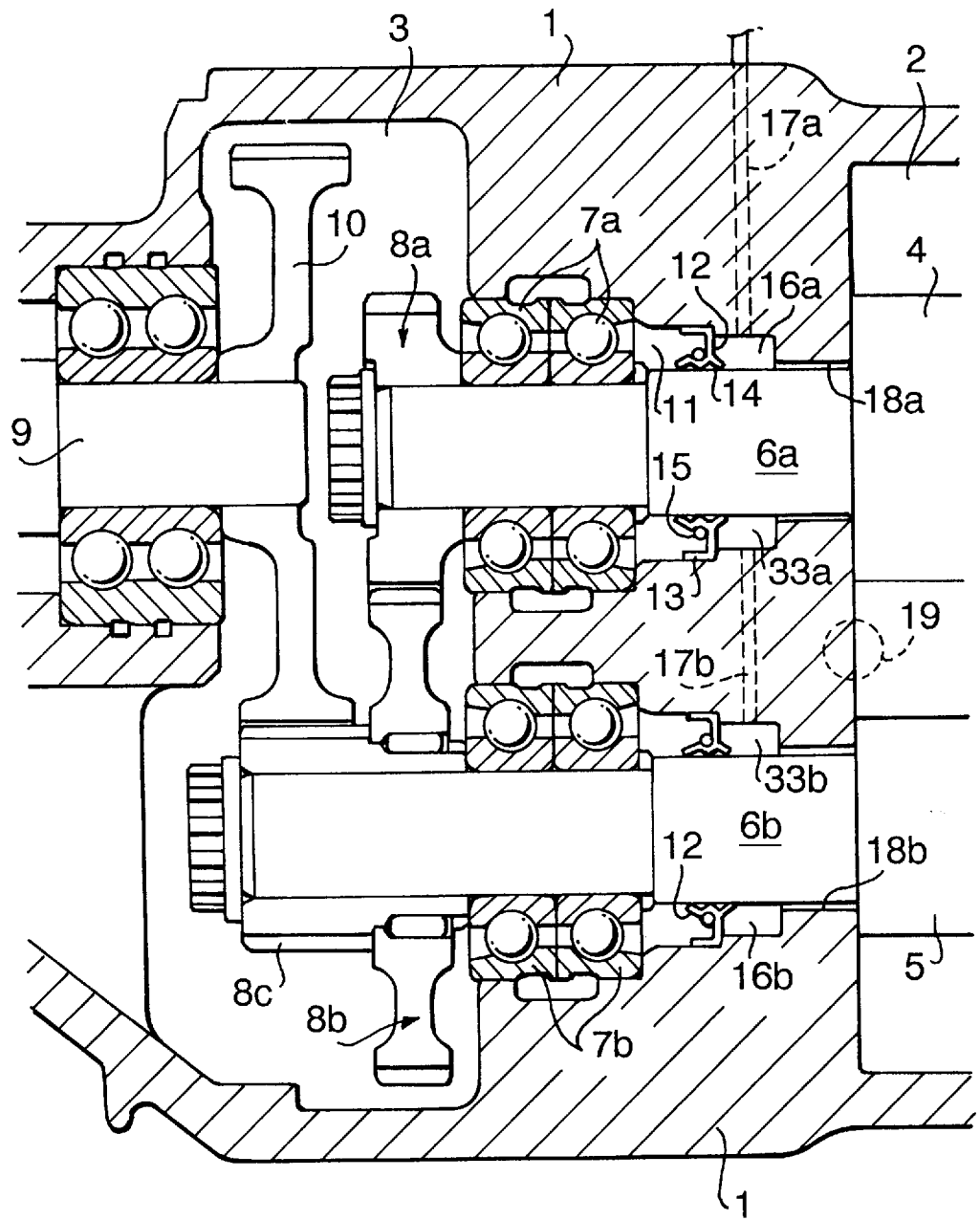
FIG. 1 illustrates a sectional view of a seal arrangement for an engine-driven supercharger according to a first embodiment of the present invention.

Referring to FIG. 1, illustrated is part of a supercharger in cross section which incorporates a seal arrangement of the present invention. In a supercharger housing 1, defined are a rotor chamber 2 for receiving a male rotor 4 and a female rotor 5, a first shaft chamber 33a for receiving a first drive shaft 6a of the male rotor 4, a second shaft chamber 33b for receiving a second drive shaft 6b of the female rotor 5 and a gear mechanism chamber 3 for receiving a plurality of gears 8a, 8b, 8c and 10. The first and second shaft chambers 33a and 33b are formed next to the rotor chamber 2 in the longitudinal direction of the rotor chamber and the gear chamber 3 is formed next to the first and second shaft chambers 33a and 33b. The first and second shaft chambers 33a and 33b extend in parallel to each other. In the rotor chamber 2, the male and female rotors 4 and 5 extend in parallel to each other and mesh with each other. The first drive shaft 6a extends from the male rotor 4 and projects into the first shaft chamber 33a and a second drive shaft 6b extends from the female rotor 5 and projects into the second shaft chamber 33b. These drive shafts 6a and 6b are parallel to each other and project outward from the rotor chamber 2 respectively. Each drive shaft 6a (or 6b) has a stepped portion which is reduced in diameter. A pair of bearings 7a and 7a (or 7b and 7b) is fitted over the reduced portion of the drive shaft 6a (or 6b) to rotatably support the associated rotor 4 (or 5). An outer race of each bearing 7a (or 7b) is firmly supported by the supercharger housing 1. The first gear 8a is fitted over a free end of the first drive shaft 6a and the second gear 8b is fitted over the second drive shaft 6b at a corresponding position to engage with the first gear. The second drive shaft 6b is longer than the first drive shaft 6a and the third gear 8c is mounted on a free end of the second drive shaft 6b. An input shaft 9 extends into the gear chamber 3 from the opposite side (from the left in FIG. 1) to transmit drive power to the second drive shaft 6b from an engine (not shown) via the gears 10 and 8c. The input shaft 9 has the fourth gear 10 at its free end which meshes with the third gear 8c. As the engine rotates, its drive power is transmitted to the female rotor 5 via the gears 10 and 8c and the second drive shaft 6b and to the male rotor 4 via the gears 10, 8c, 8b and 8a and the first drive shaft 6a so that the male and female rotors 4 and 5 rotate in opposite directions in the rotor chamber 2. Then, the air introduced to between the male and female rotors 4 and 5 from an intake port (not shown) of the supercharger housing 1 is compressed by the two rotating rotors 4 and 5 and the compressed air is forced toward an exit 19 of the housing in an axial direction of the rotor (in the left direction in FIG. 1) upon rotation of the rotors 4 and 5. The compressed air is released from the discharge port 19 of the supercharger housing 1 and fed to engine cylinders (not shown).

It should be noted that each rotor 4 (or 5) has another drive shaft (not shown) extending from the opposite end of the rotor and projecting into shaft chambers (not shown) from the rotor chamber 2 to be supported by associated bearings (not shown) at its free end in a similar manner as described above and illustrated in FIG. 1.

Figure 2:
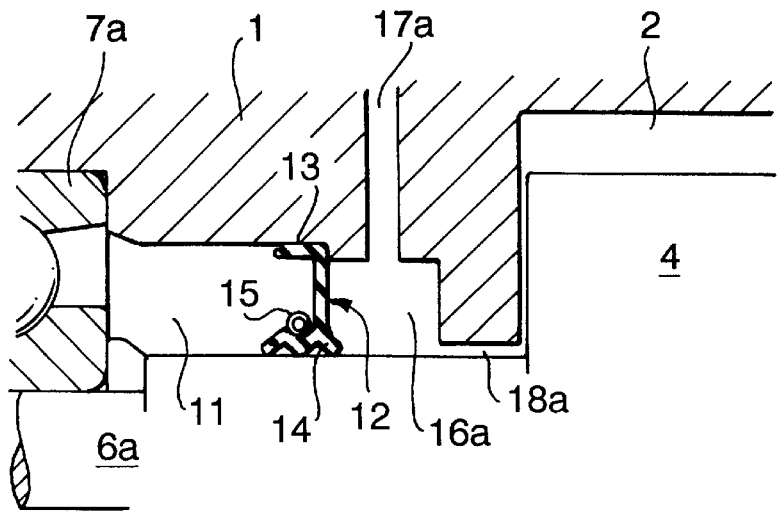
FIG. 2 illustrates an enlarged sectional view of the seal arrangement shown in FIG. 1.

An oil seal 12 is mounted on each drive shaft 6a (or 6b) between the bearing 7a (or 7b) and the rotor chamber 2 to form an oil chamber 11 between the oil seal 12 and the bearing 7a (or 7b). The oil seal 12 dams lubrication oil fed to the bearings 7a (or 7b) and creates the oil chamber 11. The oil chamber 11 is an annular space around the drive shaft 6a (or 6b). The oil seal 12 is made from a rubber sheet. An outer periphery 13 of the oil seal 12 is bent like a flange and fixed onto an inner wall of the supercharger housing 1 and an inner periphery 14 of the oil seal 12 is a wavy flange-like portion and pressed against the drive shaft 6a (or 6b) by a spring ring 15. This construction is shown in FIG. 2 in an enlarged scale. The corrugated inner periphery of the oil seal 12 defines a lip portion 14. The lip portion 14 has a certain length in the axial direction of the drive shaft 6a. The lip portion 14 is forced to a surface of the drive shaft 6a oil tightly by the spring ring 15.

Referring back to FIG. 1, an air room 16a (or 16b) is formed between each oil seal 12 and the rotor chamber 2. Each air room 16a (or 16b) is an annular space around the drive shaft 6a (or 6b). The first air room 16a for the first drive shaft 6a is opened to the air by a first bore 17a formed in the supercharger housing 1 and the other air room 16b for the second drive shaft 6b is communicated with the first air room 16a by a second bore 17b and in turn opened to the air. As best seen in FIG. 2, there is small diametrical clearance 18a between the inner wall of the supercharger housing 1 and the surface of the first drive shaft 6a in a diametrical direction of the first drive shaft 6a and between the first air room 16a and the rotor chamber 2 in the axial direction of the first drive shaft 6a. This clearance 18a functions as clearance seal to limit or suppress flow of air between the air chamber 16a and the rotor chamber 2. Similar clearance 18b is formed around the second drive shaft 6b between the second air chamber 16b and the rotor chamber 2 as shown in FIG. 1.

Figure 3:
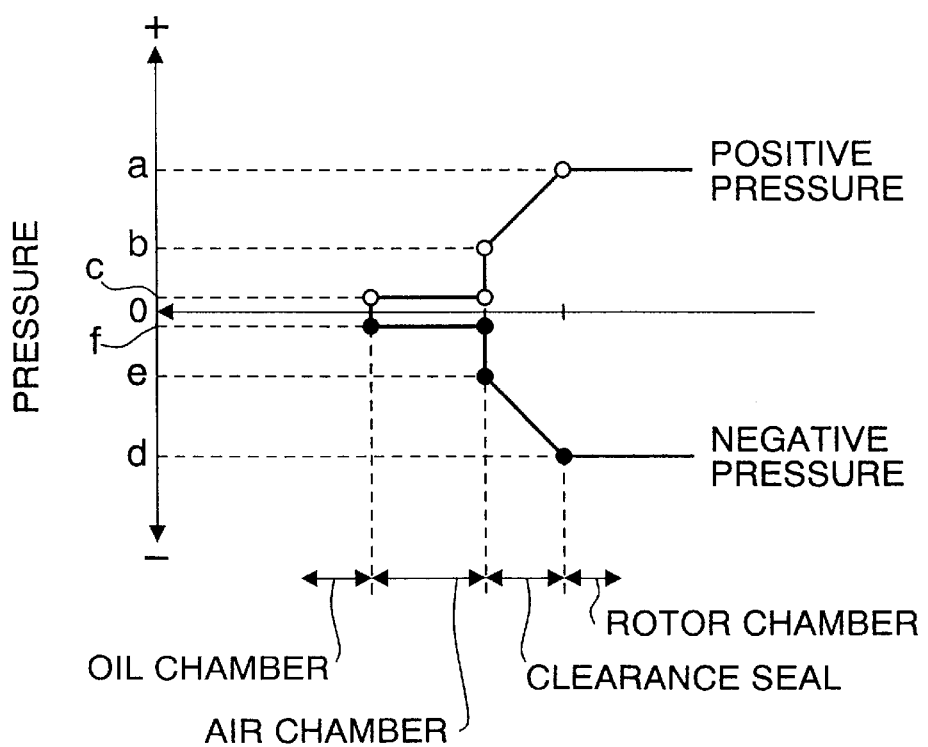
FIG. 3 illustrates pressure change of the air leaking from a rotor chamber to an oil chamber according to the first embodiment.

Now, operation of the seal arrangement of this embodiment will be described with reference to FIGS. 1 and 3.

Drive power of the engine is transferred to the input shaft 9 by belts or the like (not shown) so that the input shaft 9 is rotated. Then, rotation of the input shaft 9 is transferred to the first and second drive shafts 6a and 6b of the first and second rotors 4 and 5 respectively by a train of gears 10, 8c, 8b and 8a respectively. Accordingly, the first and second rotors 4 and 5 are rotated in the rotor chamber 2 to draw the air from the intake port of the housing 1. The air is compressed by the rotating two rotors 4 and 5 and discharged from the discharge port 19 when the discharge port 19 is opened upon completion of the compression operation of the supercharger. The compressed air is fed to the engine cylinders. During the air compression operation, the pressure in the rotor chamber 2 is positive. On the other hand, when fresh air is sucked into the rotor chamber 2 (after the compressed air delivery to the engine cylinders), the pressure inside the rotor chamber 2 becomes negative.

Therefore, when fresh air is introduced to the rotor chamber 2 (air intake process of the supercharger 1), the air of negative pressure leaks to the air chamber 16a (or 16b) from the rotor chamber 2, and when compressed air is expelled from the discharge port 19 (air compression/discharge process of the supercharger), the air of positive pressure leaks. In this particular embodiment, however, the pressure of the air leaking during the compression/discharge process is moderated by the clearance or throttled passage 18a (or 18b) as the high pressure air flows into the air chamber 16a (or 16b) from the rotor chamber 2 as indicated by pressure drop from the point "a" to the point "b" in FIG. 3. Further, the air which has reached the air chamber 16a (or 16b) is soon expelled to the outside through the passage 17a (or 17a and 17b). Consequently, the pressure in the air chamber 16a (or 16b) is promptly lowered to the atmosphere pressure even if the relatively high pressure air comes in (pressure drop from "b" to "c" in FIG. 3). Therefore, the oil seal 12 which defines one wall of the air chamber 16a (or 16b) is not damaged by the high pressure leakage air from the rotor chamber 2. In other words, the lip portion 14 of each oil seal 12 is not pushed strongly against the surface of the drive shaft 6a (or 6b) by the leakage air. Accordingly, burning and/or excessive wear and tear of the oil seal 12 is prevented. When the negative pressure air leaks to the air chamber 16a (or 16b) from the rotor chamber 2, on the other hand, the air pressure is raised by the clearance 18a (or 18b) as indicated by pressure rise from the point "d" to the point "e" in FIG. 3. The air of negative pressure "e" reaches the air chamber 16a (or 16b) and is soon expelled to the atmosphere by the passage 17a (or 17a and 17b). Accordingly, the pressure in the air chamber 16a (or 16b) is quickly raised to the atmosphere pressure and the oil seal 12 (particularly its lip portion 14) is not damaged. Prompt recovery of the pressure in the air chambers 16a and 16b to the atmosphere pressure from the negative pressure also prevents drawing of the lubrication oil from the oil chamber 11 into the air chambers 16a and 16b.

Next, a second embodiment of the present invention will be described with reference to FIGS. 4 and 5.

This embodiment is similar to the first embodiment so that same or like reference numerals are assigned to same or like items in the following description and relevant drawings and mainly the differences will be described.

Figure 4:
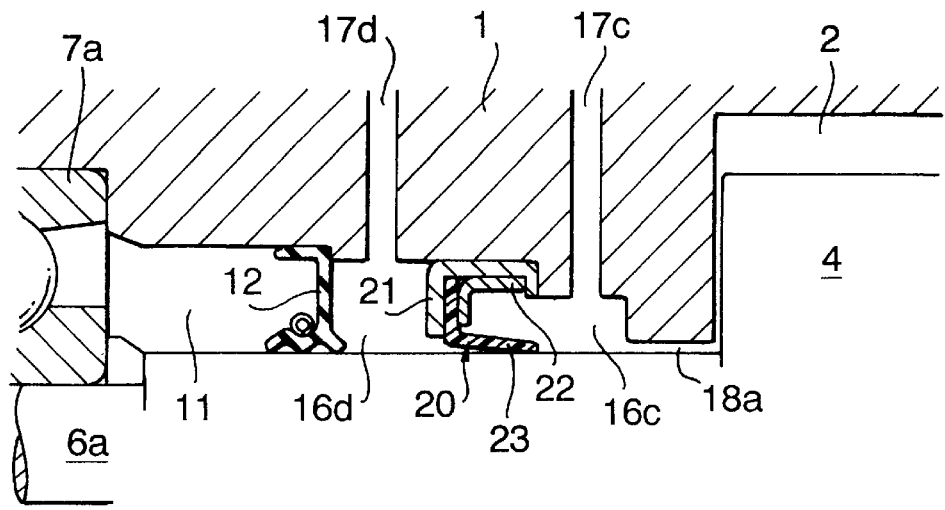
FIG. 4 is an enlarged sectional view of a seal arrangement for an engine-driven supercharger according to a second embodiment of the present invention.
Figure 5:
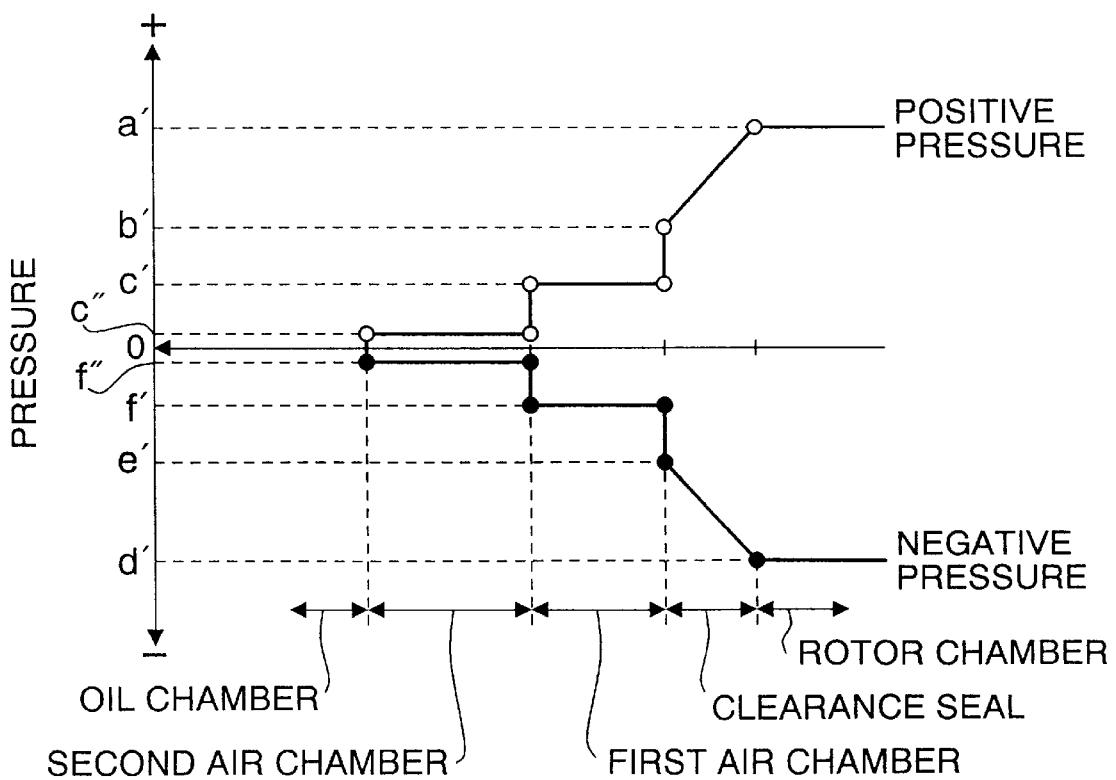
FIG. 5 is a graph showing pressure change of the air leaking from a rotor chamber to-an oil chamber according to the second embodiment.

Referring to FIG. 4, the air chamber around the first drive shaft 6a (which corresponds to the first air chamber 16a in FIG. 1) is divided into two sub-chambers 16c and 16d by another seal 20 in the longitudinal direction of the first drive shaft 6a. The first sub-chamber 16c is defined between the rotor chamber 2 and the second seal 20 and the second sub-chamber 16d is defined between the oil seal 12 and the second seal 20. This embodiment is particularly advantageous if used for an engine-driven supercharger which operates at high speed and high pressure. The reason will be described later with reference to FIG. 5.

Like the first embodiment shown in FIG. 1, the oil chamber 11 is formed between the bearing 7a and the oil seal 12. The oil seal 12 is made from a rubber sheet material.

The second seal 20 is an air seal. The second seal 20 includes first to third annular members 21, 22 and 23 which surround the first drive shaft 6a respectively. Each annular member 21–23 has an L-shaped cross section as illustrated in FIG. 4. The first annular member 21 is attached to the inner wall of the supercharger housing 1 along its outer periphery or its one leg of "L" such that its another leg vertically extends toward the first drive shaft 6a and the second annular member 22 is attached over the first annular member along its outer periphery or its one leg such that its another leg vertically extends toward the first drive shaft 6a in a parallel relation with the extending leg of the first annular member 21 with a certain gap. One leg of "L" of the third annular member 23 is inserted into the gap between the first and second annular members 21 and 22 and the other leg contacts the surface of the first drive shaft 6a. The first and second annular members 21 and 22 are metallic rings. The third annular member 23 is a teflon ring. The first sub-chamber 16c has a first air passage 17c which is bored in the supercharger housing 1 and extends from the first sub-chamber 16c to the outer surface of the housing 1 like the passage 17a shown in FIG. 1. Likewise, the second sub-chamber 16d has a second air passage 17d which is drilled or molded vertically from the outer surface of the housing 1. The clearance 18a between the first sub-chamber 16c and the rotor chamber 2 serves as a clearance seal like the foregoing embodiment.

Now, operations of this embodiment will be described with reference to FIG. 5.

The engine-driven supercharger of this embodiment is designed to operate at a high speed. Specifically, the male and female rotors are adapted to rotate at a high speed in the rotor chamber 2. As a result, positive and negative pressures generated in the rotor chamber 2 have greater values than the previous embodiment. Therefore, a larger difference is detected between the highest leaking pressure (i.e., air pressure leaking from the rotor chamber 2 in the air compression process (positive pressure)) and the lowest leaking pressure (i.e., air pressure leaking from the rotor chamber 2 in the air intake process (negative pressure)). As understood from comparison of FIG. 5 with FIG. 3, the positive pressure "a'" in FIG. 5 is higher than "a" in FIG. 3 and the negative pressure "d'" is lower than "d". As the compressed air having positive pressure "a'" leaks from the rotor chamber 2 to the first sub-chamber 16c through the clearance or throttled passage 18a, its pressure drops to "b'". The first sub-chamber 16c is opened to the air via the first air passage 17c so that the pressure of the leakage air is further lowered to "c'" almost instantaneously. It should be remembered here, however, that the supercharger of this embodiment produces very high pressure so that usually releasing of the high pressure air to the outside by the first air passage 17c is not enough: the air pressure does not fall to the atmosphere pressure in the first sub-chamber 16c. Then, the air further leaks to the second sub-chamber 16d through the air seal 20. Specifically, the air leaks a very small clearance between the teflon ring 23 and the surface of the first drive shaft 6a of the rotor 4. The second sub-chamber 16d is also opened to the air by the second air passage 17d so that the air pressure drops to "c''" in the second sub-chamber 16d from "c'". The value "c''" is substantially equal to the atmosphere pressure.

In this manner, the air pressure is ultimately lowered to the air pressure in a stepwise manner in this particular embodiment. Thus, the oil seal 12 is not damaged by the leakage air from the rotor chamber 2 and the sealing of the oil chamber 11 is appropriately maintained. Even if the oil seal 12 is made from a rubber sheet material, which is a relatively weak material, burning and abnormal abrasion would not occur. When the air of negative pressure ("d'" in FIG. 5) leaks from the rotor chamber 2 to the first sub-chamber 16c, its pressure is raised to "e'" by the clearance seal 18a and to "f'" by the first sub-chamber 16c and the first air passage 17c. The external air is introduced to the first sub-chamber 16c from the first passage 17c to raise the air pressure in the first sub-chamber 16c. The air pressure "f'" in the first sub-chamber 16c is still relatively far from the atmosphere pressure. Therefore, the negative pressure air further leaks to the second sub-chamber 16d. Since the second sub-chamber 16d is communicated with the outside, the pressure of the air which enters the second sub-chamber 16d is promptly raised to "f'". The air pressure f" in the second sub-chamber 16d is thereby always maintained at substantially the atmosphere pressure. Accordingly, the oil seal 12 is not damaged by the negative pressure air from the rotor chamber 2.

Figure 6:
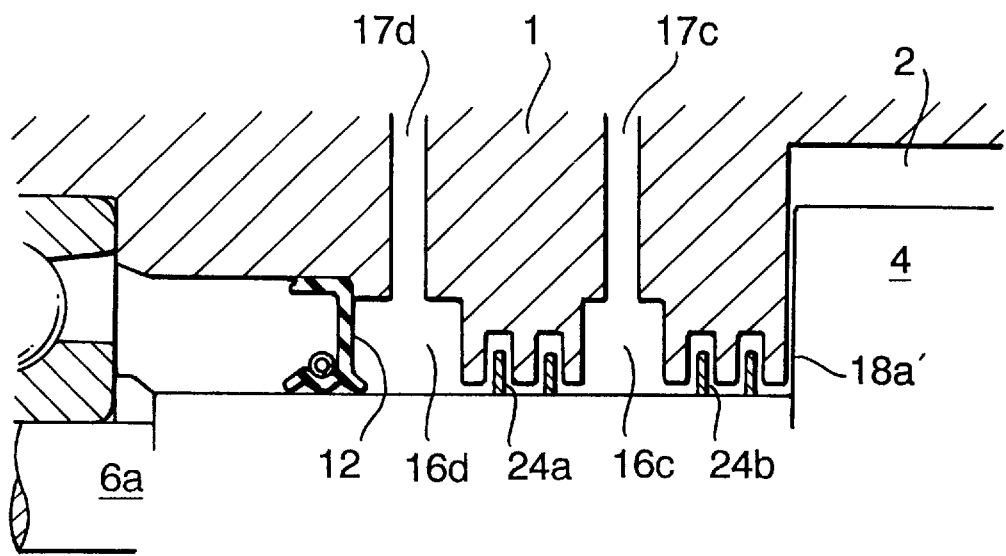
FIG. 6 illustrates an enlarged sectional view of a seal arrangement according to a third embodiment.

A third embodiment of the present invention is illustrated in FIG. 6.

The seal 20 in the previous embodiment (FIG. 4) is replaced with a first labyrinth seal 24a and part of the air clearance seal or throttled passage 18a (FIG. 4) is replaced with a second labyrinth seal 24b. The first labyrinth seal 24a separates the first and second sub-chambers 16c and 16d. The second labyrinth seal 24b is provided just next to the rotor chamber 2 so that the negative or positive pressure of the air leaking from the rotor chamber 2 is first moderated by a narrow passage or throttled passage 18a' and the second labyrinth seal 24b. Other construction of this embodiment is the same as the second embodiment. Like the embodiment shown in FIG. 4, the positive or negative air pressure leaking from the rotor chamber 2 is first lowered or raised by the first throttled passage 18a' and the second labyrinth seal 24b, then lowered or raised in the first air chamber 16c. Following this, the air pressure is further lowered or raised by the first labyrinth seal 24a and lowered or raised in the second air chamber 16d. The air pressure in the second air chamber 16d is substantially equal to the atmosphere pressure. Accordingly, the leakage air from the rotor chamber 2 is sufficiently moderated before it reaches the oil seal 12. Therefore, it is possible to prevent the oil seal 12 from being damaged by the leakage air from the rotor chamber 2.

Figure 7:
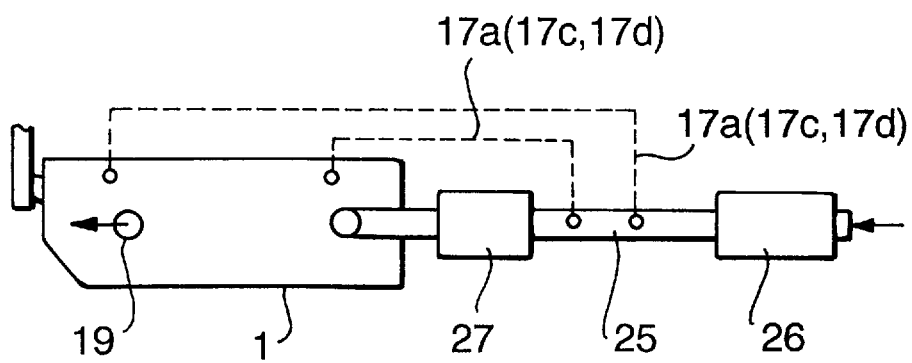
FIG. 7 depicts air passages for the rotor chamber of the supercharger of the present invention.

FIG. 7 illustrates a modification. The external air passage 17a (17c, 17d) may extend to an air intake line 25 of the rotor chamber 2 as indicated by the dot line in FIG. 7. In a typical engine, an air filter 26 and a throttle 27 are provided on the air intake line 25. The external air passage 17a (17c, 17d) preferably extends from the associated air chamber 16a (16c, 16d) to a certain position downstream of the air filter 26 and upstream of the throttle 27 such that filtered air is introduced to the air chamber 16a (16c, 16d).

What is claimed is:

1. A seal arrangement for an engine-driven supercharger, the supercharger including a housing, a rotor chamber formed in the housing, a rotor rotatably placed in the rotor chamber, a shaft chamber formed next to the rotor chamber, a bearing provided inside the shaft chamber and means for feeding a lubrication oil to the bearing, the rotor having a longitudinal direction and a shaft projecting from the rotor chamber into the shaft chamber in the longitudinal direction of the rotor, the bearing being adapted to support the rotor shaft and the operation of the engine and the supercharger causing external air to be introduced into and sucked from the rotor chamber causing the pressure of the air in the rotor chamber to vary between a a positive pressure and a negative pressure, comprising:

a first oil seal fitted on the rotor shaft between the bearing and the rotor chamber for defining a lubrication oil chamber in the shaft chamber between the first seal and the bearing and defining an air chamber in the shaft chamber between the first seal and the rotor chamber;

a second seal provided in the air chamber to divide the air chamber into first sub-air chamber on the rotor chamber side and a second sub-air chamber on the lubrication oil chamber side, the second seal allowing gas leakage from the first sub-air chamber to the second sub-air chamber to a certain extent;

a first air passage extending to the outside atmosphere from the first sub-air chamber such that positive negative pressure of the air leaking to the first sub-air chamber from the rotor chamber is lowered toward the atmosphere pressure when the air enters the first sub-air chamber which communicates with the outside atmosphere the first air passage; and a second air passage extending to the outside atmosphere from the second sub-air chamber such that the positive or negative pressure of the air further leaking to the second sub-air chamber from the second sub-air chamber is lowered still further toward the atmosphere pressure when the air enters the second sub-air chamber which also communicates with the outside atmosphere via the second air passage.

2. The seal arrangement of claim 1, wherein the first seal is an oil seal.

3. The seal arrangement of claim 1, wherein the oil seal is a rubber seal.

4. The seal arrangement of claim 1, wherein the second seal is an air seal.

5. The seal arrangement of claim 1, wherein the second seal includes a member made from Teflon sheet material.

6. The seal arrangement of claim 1, wherein the second seal includes a labyrinth seal.

7. The seal arrangement of claim 1 further including means formed between the rotor chamber and the first sub-air chamber for throttling the air which leaks from the rotor chamber to the first sub-air chamber before the air reaches the first sub-air chamber, thereby moderating the air pressure when the leakage air enters the first sub-air chamber from the rotor chamber.

8. The seal arrangement of claim 7, wherein the throttle means includes a labyrinth seal.

9. The seal arrangement of claim 7, wherein the throttle means includes an air clearance seal defined by an inner wall of the housing and a surface of the rotor shaft between the rotor chamber and the first sub-air chamber.

10. The seal arrangement of claim 9, wherein the throttle means further includes a labyrinth seal.

11. A seal arrangement for an engine-driven supercharger, the supercharger including a housing, a rotor chamber formed in the housing, parallel first and second rotors rotatably placed in the rotor chamber, parallel first and second shaft chambers formed next to the rotor chamber, first and second bearings provided in the first and second shaft chambers and means for feeding a lubrication oil to the first and second bearings, the first and second rotors having first and second shafts projecting in parallel to each other from the rotor chamber into the first and second shaft chambers respectively, the first and second bearings being adapted to support the first and second rotor shafts at free ends of the first and second rotor shafts respectively, the operation of the engine and the supercharger causing external air to be introduced into and sucked from the rotor chamber causing the pressure of the air in the rotor chamber to vary between a positive pressure and a negative pressure, comprising:

- a first seal fitted on the first rotor shaft between the first bearing and the rotor chamber for defining a first oil chamber in the first shaft chamber between the first seal and the first bearing and defining a first air chamber in the first shaft chamber between the first seal and the rotor chamber;
- a second seal fitted on the second rotor shaft between the second bearing and the rotor chamber for defining a second oil chamber in the second shaft chamber between the second seal and the second bearing and defining a second air chamber in the second shaft chamber between the second seal and the rotor chamber;
- a third seal provided in the first air chamber to divide the first air chamber into a first sub-air chamber on the rotor chamber side and a second sub-air chamber on the first oil chamber side, the third seal allowing gas leakage from the first sub-air chamber to the second sub-air chamber to a certain extent;
- a fourth seal provided in the second air chamber to divide the second air chamber into a third sub-air chamber on the rotor chamber side and a fourth sub-air chamber on the second oil chamber side, the fourth seal allowing gas leakage from the third sub-air chamber to the fourth sub-air chamber to a certain extent;
- a first air passage extending from the first sub-air chamber to the outside atmosphere;
- a second air passage extending from the third sub-air chamber to the first sub-air chamber;
- a third air passage extending from the second sub-air chamber to the outside atmosphere; and
- a fourth air passage extending from the fourth sub-air chamber to the second sub-air chamber.

12. The seal arrangement of claim 11, wherein each of the first and second seals is an oil seal.

13. The seal arrangement of claim 11, wherein each of the first and second seals is a rubber seal.

14. The seal arrangement of claim 11, wherein each of the third and fourth seals includes an air seal.

15. The seal arrangement of claim 11, wherein each of the third and fourth seals includes a member made from a Teflon sheet material.

16. The seal arrangement of claim 11, wherein each of the third and fourth seals includes a labyrinth seal.

17. The seal arrangement of claim 11 further including first throttle means for throttling the air which leaks from the rotor chamber to the first sub-air chamber before the air enters the first sub-air chamber, thereby moderating the pressure of the air leaking from the rotor chamber to the first sub-air chamber.

18. The seal arrangement of claim 17, wherein the first throttle means includes a labyrinth seal.

19. The seal arrangement of claim 17, wherein the first throttle means includes an air clearance seal defined by an inner wall of the housing and a surface of the first rotor shaft between the rotor chamber and first sub-air chamber.

20. The seal arrangement of claim 19, wherein the first throttle means further includes a labyrinth seal.

21. The seal arrangement of claim 17, further including second throttle means for throttling the air which leaks from the rotor chamber to the third sub-air chamber before the air enters the third sub-air chamber, thereby moderating the pressure of the air leaking from the rotor chamber to the third sub-air chamber.

22. The seal arrangement of claim 21, wherein the second throttle means includes a labyrinth seal.

23. The seal arrangement of claim 21, wherein the second throttle means includes an air clearance seal defined by an inner wall of the housing and a surface of the second rotor shaft between the rotor chamber and the third sub-air chamber.

24. The seal arrangement of claim 23, the second throttle means further includes a labyrinth seal.

* * * * *